US009491107B1

(12) United States Patent
Scudder et al.

(10) Patent No.: US 9,491,107 B1
(45) Date of Patent: Nov. 8, 2016

(54) NON-STOP ROUTING WITH INTERNAL SESSION MIRRORING AND ADAPTIVE APPLICATION-LEVEL RATE LIMITING

(71) Applicant: Juniper Networks, Inc., Sunnyvale, CA (US)

(72) Inventors: John Galen Scudder, Ann Arbor, MI (US); Martin Djernaes, Roskilde (DK); Sameer Seth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 223 days.

(21) Appl. No.: 14/320,130

(22) Filed: Jun. 30, 2014

(51) Int. Cl.
*G06F 15/16* (2006.01)
*H04L 12/835* (2013.01)
*H04L 12/703* (2013.01)
*H04L 12/761* (2013.01)
*H04L 12/773* (2013.01)

(52) U.S. Cl.
CPC ............ *H04L 47/30* (2013.01); *H04L 45/16* (2013.01); *H04L 45/28* (2013.01); *H04L 45/60* (2013.01)

(58) Field of Classification Search
None
See application file for complete search history.

(56) References Cited

U.S. PATENT DOCUMENTS

| 7,447,225 B2 * | 11/2008 | Windisch ............ H04L 12/1877 370/428 |
| 7,787,360 B2 * | 8/2010 | Windisch ................ H04L 45/00 370/217 |
| 7,940,650 B1 | 5/2011 | Sandhir et al. |
| 7,944,844 B2 * | 5/2011 | Ee ........................ H04L 12/2697 370/248 |
| 8,050,559 B2 | 11/2011 | Sindhu |
| 9,077,617 B1 * | 7/2015 | Seth .................... H04L 41/0668 |
| 2008/0101314 A1 * | 5/2008 | Bachmutsky ....... H04L 43/0817 370/342 |
| 2012/0063449 A1 * | 3/2012 | Frederic ................ H04L 69/162 370/389 |
| 2012/0131222 A1 * | 5/2012 | Curtis ................. H04L 47/2441 709/235 |
| 2012/0147888 A1 * | 6/2012 | Lu ........................... H04L 45/54 370/392 |
| 2014/0089484 A1 * | 3/2014 | Chin ....................... H04L 41/00 709/223 |

\* cited by examiner

*Primary Examiner* — Thomas Dailey
(74) *Attorney, Agent, or Firm* — Shumaker & Sieffert, P.A.

(57) ABSTRACT

This application describes techniques for replicating data at a primary routing engine of a network device before processing the data at a transport layer of the primary routing engine, wherein the data is to be sent to a routing peer via a routing communication session, and sending the replicated data to a secondary routing engine of the network device to be processed at a transport layer of the secondary routing engine. The secondary routing engine, in response to detecting that a socket buffer for buffering the replicated data has reached a predefined high occupancy threshold, outputs a notification to the primary routing engine. In response to receiving the notification, an application-layer routing process of the primary routing engine refrains from sending at least some of a plurality of routing updates to the routing peer, and continues to send keepalive messages for the routing communication session to the routing peer.

20 Claims, 5 Drawing Sheets

NON-STOP ROUTING WITH INTERNAL SESSION MIRRORING AND ADAPTIVE APPLICATION-LEVEL RATE LIMITING

TECHNICAL FIELD

The disclosure relates to computer networks and, more particularly, to routers that perform a switchover from a primary routing component to a secondary routing component.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility for processing and responding to routing protocol messages and computing routing information and forwarding information. During a switchover from the primary routing control unit to the secondary routing control unit, a significant period of time may elapse before the secondary routing control unit reaches a state in which it is able to process and respond to routing protocol messages. For example, the secondary routing control unit may need to reestablish routing communication sessions, e.g., BGP sessions, that were lost when the primary routing control unit failed. During this period, network traffic may be queued or lost.

SUMMARY

In general, this disclosure describes techniques for improving scalability of non-stop routing (NSR) in a router that uses state replication from a primary control unit to a backup control unit for routing communication sessions maintained by the router, such as replication of transmission control protocol (TCP) sockets used to communicate with peer routers. More specifically, techniques are described that allow application-level adjustment in the primary control unit for rate limiting routing communications with peer routers based on real-time feedback from the backup control unit as to its ability to process the replicated state data.

For example, the technique may be applied in routers that provide graceful switchover from the primary control unit (e.g., a primary routing engine) to the backup control unit (e.g., a secondary routing engine) where the backup control unit transparently takes control of routing communication sessions with peer router. This allows the routing communication sessions to be preserved even when the primary control unit fails. Data for the sockets associated with routing communication sessions on the primary routing engine is transparently replicated to the secondary routing engine in real-time prior to any switchover event. The secondary routing engine constructs and maintains sockets so as to mimic the sockets of the primary routing engine. During a switchover, the sockets on the secondary routing engine contain all the information needed to ensure that the connections with the routing peers stay up and need not be reestablished. This information typically includes both any communication data queued in the socket buffer as well as any kernel state data for the connection itself, e.g., any TCP state.

When a number of routing communication sessions is large, it may be difficult for the secondary routing engine to process the data for sockets received from the primary routing engine as fast as the primary routing engine is sending the data to the secondary routing engine. When this happens, socket buffers on the secondary routing engine may fill and the primary routing engine may not receive a timely acknowledgement from the secondary routing engine indicating that the replicated socket data has been processed by the secondary routing engine. In turn, the primary routing engine may not timely send keepalive messages and routing updates to its routing communication session peer, and the routing communication session may be dropped by the peer.

The techniques of this disclosure provide mechanisms for the secondary routing engine to track its socket buffer occupancy for routing communication sessions, and provide real-time feedback to the underlying operating system of the primary routing engine, which in turn relays information to a routing application executing within the primary routing engine for providing application-layer adaptive control over routing communications with peer routers. For example, the secondary routing engine may inform the primary routing engine when a high water mark threshold occupancy is reached within its socket buffer holding replicated state data from the primary routing engine. In response, the underlying operating system of the primary routing engine outputs a signal (e.g., a message) to one or more application-layer routing processes executing on the primary routing engine. In turn, the application-layer routing processes can perform certain actions based on pre-defined policies. In one example, an application-layer routing process may enter a "life-support mode" in which the application-layer routing process outputs fewer messages on its routing communication sessions with external routing peers, which in turn causes the underlying operating system to replicate less data for the sockets associating with the routing communication sessions to the operating system of the secondary routing engine. For example, when in the life-support mode for a given routing communication session, the primary routing engine may send only keepalive messages and may not send any routing updates to its routing communication session peer. As another example, when in the life-support mode for a given routing communication session, the primary routing engine may send keepalive messages and only selected routing updates, e.g., based on priority level of the routing updates.

In one example aspect, a method includes by a primary routing engine of a network device, replicating data output by an application-layer routing process of the primary routing engine for transmission to a routing peer network device via a routing communication session between the network device and the routing peer network device, sending the replicated data to a secondary routing engine of the network device, and, by the secondary routing engine, in response to detecting that a buffer of the secondary routing engine for buffering the replicated data has reached a predefined high occupancy threshold, outputting a notification to the primary routing engine indicating that the socket buffer has reached the predefined high occupancy threshold. The method also includes by the primary routing engine and in response to receiving the notification, signaling the application-layer routing process to notify the application-layer routing process that the socket buffer of the secondary routing engine has reached the predefined high occupancy threshold, and by the application-layer routing process of the primary routing engine and in response to receiving the signal, entering a life-support mode in which the application-layer routing process refrains from sending at least some of a plurality of routing updates to the routing peer network device via the routing communication session, and continues to send keepalive messages for the routing communication session to the routing peer network device.

In another example aspect, a network device includes a plurality of interface cards to send and receive packets over a network, and a first routing engine and a second routing engine, wherein the first routing engine is configured as a primary routing engine and the second routing engine is configured as a secondary routing engine, wherein the first routing engine comprises a plurality of sockets, wherein each of the plurality of sockets is associated with one of a plurality of routing communication sessions with peer routers, and wherein the primary routing engine is configured to replicate data output by an application-layer routing process of the primary routing engine for transmission to a routing peer network device via a routing communication session between the network device and the routing peer network device, and send the replicated data to the secondary routing engine. The secondary routing engine is configured to, in response to detecting that a buffer of the secondary routing engine for buffering the replicated data has reached a predefined high occupancy threshold, output a notification to the primary routing engine indicating that the socket buffer has reached the predefined high occupancy threshold. The primary routing engine is configured to signal the application-layer routing process to notify the application-layer routing process that the socket buffer of the secondary routing engine has reached the predefined high occupancy threshold, and the application-layer routing process of the primary routing engine is configured to, in response to receiving the signal, enter a life-support mode in which the application-layer routing process refrains from sending at least some of a plurality of routing updates to the routing peer network device via the routing communication session, and continue to send keepalive messages for the routing communication session to the routing peer network device.

In another example aspect, a computer-readable storage medium includes instructions for causing a programmable processor to, by a primary routing engine of a network device, data output by an application-layer routing process of the primary routing engine for transmission to a routing peer network device via a routing communication session between the network device and the routing peer network device, send the replicated data to a secondary routing engine of the network device, and by the secondary routing engine of the network device, in response to detecting that a buffer of the secondary routing engine for buffering the replicated data has reached a predefined high occupancy threshold, output a notification to the primary routing engine indicating that the socket buffer has reached the predefined high occupancy threshold. The computer-readable storage medium further includes instructions to, by the primary routing engine, signaling the application-layer routing process to notify the application-layer routing process that the socket buffer of the secondary routing engine has reached the predefined high occupancy threshold, and, by the application-layer routing process of the primary routing engine and in response to receiving the signal, enter a life-support mode in which the application-layer routing process refrains from sending at least some of a plurality of routing updates to the routing peer network device associated with a routing communication session, and continues to send keepalive messages for the routing communication session to the routing peer network device.

The techniques described herein may provide certain advantages. For example, the techniques allow for performing non-stop routing even when the network is operating at a large scale, such as when a router has a few thousand routing communication session peers. The techniques of the disclosure can avoid an issue in which slow processing of replicated state data by a routing application process on the backup routing engine can force the routing application process on the primary routing engine to stall and become unresponsive to its peer, causing the routing communication session to drop. These techniques can provide improved scaling of an NSR-enabled system while also improving its stability, without requiring any major changes to the underlying NSR system. Moreover, the techniques may be applied while still achieving the guarantee that the backup routing engine will be properly aware of the current state of the primary routing engine.

The details of one or more examples are set forth in the accompanying drawings and the description below. Other features, objects, and advantages will be apparent from the description and drawings, and from the claims.

DETAILED DESCRIPTION

Figure 1:
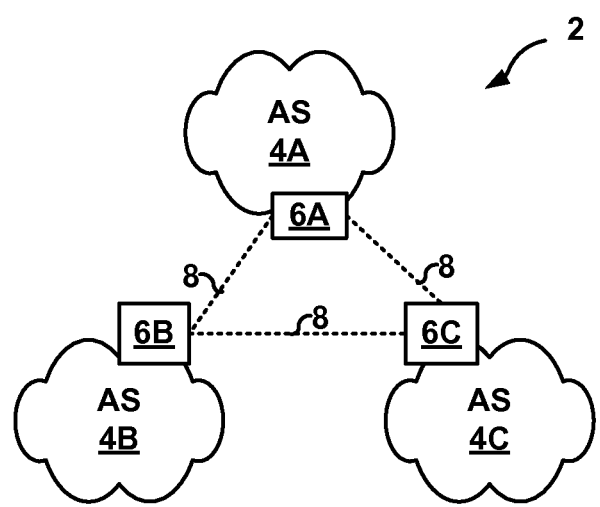
FIG. 1 is a block diagram illustrating an example computing network formed by autonomous systems interconnected by communication links.

FIG. 1 illustrates an example computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include routers 6A-6C ("routers 6") for sharing routing information and forwarding packets via communication links 8. That is, routers 6 maintain peer routing sessions and exchange messages conveying routing information in accordance with a routing protocol, such as the Border Gateway Protocol (BGP). Routers 6 may be autonomous system border routers (ASBRs), for example. The messages communicated over the routing sessions typically advertise and withdraw routes for reaching destinations within network 2. In the event of a network topology change, such as link failure or failure of one of routers 6, any of the routers detecting the change may issue routing messages informing the other routers of the affected routes. In response, routers 6 can select new routes for reaching the destinations within network 2.

In order to mitigate the effects of node failure, one or more of routers 6 can incorporate a primary routing engine and one or more backup routing engines to assume routing responsibilities in the event the primary routing engine fails. One or more of routers 6 may provide graceful switchover from the primary routing engine to one of the secondary routing engines using replication of routing communication sessions, such as transmission control protocol (TCP) sockets. That is, data for the sockets associated with the routing communication sessions on the primary routing engine is transparently replicated to the secondary routing engine in real-time (i.e., while the primary routing engine exchanges routing messages) prior to any switchover event.

The secondary routing engine constructs and maintains communication sockets so as to mimic the sockets currently used by the primary routing engine when communicating with the other routers 6. During a switchover from the primary routing engine to the secondary routing engine, the pre-established sockets on the secondary routing engine contain all the information needed to ensure that the connections with the routing peers stay up and need not be reestablished. This information typically includes both any communication data queued in the socket buffer as well as any kernel state data for the connection itself, e.g., any TCP state, for instance. This state replication allows for non-stop routing (NSR), such that routing sessions are not interrupted by a switchover event. Further details on TCP state replication are described in U.S. Pat. No. 7,940,650, entitled "PEER-AGNOSTIC TCP SOCKET REPLICATION BETWEEN PRIMARY AND SECONDARY ROUTING ENGINES", issued on May 10, 2011, the entire contents of which are incorporated by reference herein. As described herein, the techniques of this disclosure may be implemented without requiring changes to networking protocols, such as the TCP protocol.

For example purposes, the techniques of this disclosure will be described in reference to router 6A. As one example, router 6A may have a primary routing component (e.g., a routing engine) and a secondary, or back-up, routing component. However, any or all of routers 6B-6C may operate in accordance with the techniques described herein. In this example, router 6A provides non-stop routing by including a primary routing engine as well as one or more standby routing engines (not shown). In the event of a switchover, i.e., when the primary routing engine of router 6A fails or otherwise needs to be shut down, one of the standby routing engines assumes control over routing resources and routing functionality generally. Prior to the switchover, the primary and standby routing engines synchronize their respective state information to allow the standby routing engine to assume control of the router resources without having to relearn state information. Moreover, a corresponding TCP socket is pre-established on the standby routing engine for each TCP socket currently in use by the primary routing engine for routing sessions.

During a network communication session, software executing on the primary routing engine allows the secondary routing engine to "snoop" messages exchanged between the primary routing engine and routing peers using TCP sockets. That is, when router 6A receives data intended for the primary routing engine, the data may first be replicated to the secondary routing engine before the primary routing engine issues an acknowledgement to the peer router. Similarly, when the primary routing engine outputs a message, the output data may first be passed to the secondary routing engine, before being output to the network. In this manner, the secondary routing engine may maintain state information that is equivalent to the primary routing engine at all times. Therefore, when the router switches over from the primary routing component to the secondary routing component (for example, in the event of a failover), the secondary routing component may perform these duties without interruption to routing function and, thus, preventing any routing flaps by the peer routers.

In some examples, router 6A may engage in a routing session with, e.g., router 6B using a TCP socket. Router 6A and router 6B may exchange routing messages over the TCP socket in accordance with a routing protocol, such as BGP. When router 6A receives a routing message from router 6B, the routing message may be internally forwarded to the primary routing engine of router 6A for processing. Before being fully processed by the primary routing engine and acknowledged, however, the received routing message is replicated and sent to the secondary routing engine of router 6A. Similarly, when router 6A outputs routing messages to router 6B via the TCP socket, the routing message to be sent is replicated and sent to the secondary routing engine.

Upon receiving inbound or outbound routing messages, the secondary routing engine updates state information for its TCP socket corresponding to the TCP socket of the primary routing engine used for the communication session. In particular, the primary routing engine of router 6A may send replicated data to the secondary routing engine before the data is processed by a transport layer for the socket on the primary routing engine. For example, data may be replicated and communicated to the backup routing engine before outbound data is packaged into a TCP packet (when sending data) by the transport layer or before an inbound packet is unpacked from a TCP packet (when receiving data) by the transport layer. This asymmetric replication of data for routing messages at different levels of the networking stack aids router 6A in ensuring that the state of the corresponding TCP socket on the backup routing engine matches that of the TCP socket of the primary routing engine.

In the event that the primary routing engine of router 6A goes down, for example as a result of a failure or because software of the primary routing engine is to be updated, the secondary routing engine detects the event (e.g., by way of heartbeat signal or explicit message from the primary) and assumes control of all routing functions. Because the secondary routing engine has received all data that the primary routing engine has sent and received, the secondary routing engine may be able to continue the communication session without the necessity of a session restart. This data includes socket data replication (e.g., replication of inbound and outbound data) as well as TCP state synchronization between kernels executing in the different routing engines. For example, the secondary routing engine may keep track of sequence numbers of received packets and received acknowledgements for the corresponding socket. The secondary routing engine may also buffer sent data such that, if the primary routing engine fails at a time when sent data is not received by a peer recipient (as determined by whether the secondary routing engine as received an acknowledgement), the secondary routing engine may retransmit the data after taking control of routing duties. In some examples, the secondary routing engine may also use TCP auto-update features upon taking control of routing duties for data that is being forwarded.

Although illustrated for simplicity with three routers 6, computing network 2 may include many additional routers (not shown). For example, in some cases a router such as router 6A may have routing sessions with thousands of peer routers (e.g., BGP peers). However, when a number of routing communication sessions is large, it may be difficult for the secondary routing engine to process the data for sockets received from the primary routing engine as fast as the primary routing engine is sending the data to the secondary routing engine. When this happens, socket buffers on the secondary routing engine may fill and the primary routing engine may not receive a timely acknowledgement from the secondary routing engine indicating that the replicated socket data has been processed by the secondary routing engine. In turn, the primary routing engine will not timely send keepalive messages and routing updates to its routing communication session peer, and the routing communication session may be dropped by the peer.

The techniques of this disclosure provide mechanisms for the secondary routing engine to track its socket buffer occupancy for routing communication sessions and other control-plane network communication sessions that run over TCP or a TCP-like transport protocol, and provide real-time feedback to the underlying operating system of the primary routing engine, which in turn relays information to a routing application executing within the primary routing engine for providing application-layer adaptive control over routing communications with peer routers. For example, the secondary routing engine may inform the primary routing engine when a high water mark threshold occupancy is reached within its socket buffer holding replicated state data from the primary routing engine. In response, the underlying operating system of the primary routing engine outputs a signal (e.g., a message) to one or more application-layer routing processes executing on the primary routing engine. In turn, the application-layer routing processes can perform certain actions based on hard-coded policies or user-defined policies. In one example, an application-layer routing process of the primary routing engine can enter a "life-support mode" in which the primary routing engine outputs fewer messages on its routing communication sessions with external routing peers, which in turn causes the underlying operating system to replicate less data for the sockets associating with the routing communication sessions to the operating system of the secondary routing engine. For example, when in the life-support mode for a given routing communication session, the primary routing engine may send only keepalive messages and may not send any routing updates to its routing communication session peer. As another example, when in the life-support mode for a given routing communication session, the primary routing engine may send keepalive messages and also selected routing updates (i.e., a subset of the routing updates), e.g., based on priority of the routing updates. In this manner, the techniques of this disclosure allow application-level adjustment in the primary control unit for rate limiting routing communications with peer routers based on real-time feedback from the backup control unit as to its ability to process the replicated state data.

The techniques described herein may provide certain advantages. For example, router 6A may be able to perform graceful switchover between routing engines, thereby achieving non-stop routing. For example, the techniques allow for performing non-stop routing even when the network is operating at a large scale, such as when router 6A has a few thousand routing communication session peers. The techniques of the disclosure can avoid an issue in which slow processing of replicated state data by a routing application process on the backup routing engine can force the routing application process on the primary routing engine of router 6A to stall and become unresponsive to its peer, causing the routing communication session to drop. These techniques can provide improved scaling of an NSR-enabled system while also improving its stability, without requiring any major changes to the underlying NSR system.

In the event of a failure or other need to bring down the primary routing engine, router 6A may be able to continue to forward packets without downtime and in a manner that avoid routing session reestablishment, thus avoiding route flapping by peer routers. Similarly, these techniques may enable a router to receive in-service software upgrades without causing route flapping. For example, when a software upgrade is necessary for the router, a system administrator may take the secondary routing engine offline to receive and install the upgrade. Once the software of the secondary routing engine has been upgraded, the state gets replicated to the secondary including, for example, TCP socket states that are associated with routing protocols. Then the primary routing engine may gracefully switch over to the secondary routing engine to upgrade the primary routing engine while the secondary routing engine maintains the routing sessions. After the primary routing engine has updated its software, the secondary routing engine may pass control back to the updated primary routing engine.

Moreover, router 6A may perform TCP socket replication transparently to outside network devices, such as routers 6B-6C, because no modification to existing communication protocols is necessary. Routers 6B-6C need not change their behavior in order for router 6A to implement TCP socket replication and non-stop routing. Moreover, routers 6B-6C need not have any knowledge of the fact that router 6A is configured to perform switchover. Additionally, the techniques described herein may be applied between a routing engine of router 6A and a routing engine of a second router, such as router 6B. That is, a routing engine of router 6A may act as a primary routing engine, while a routing engine of a second router may act as a secondary or back-up routing engine.

Figure 2:
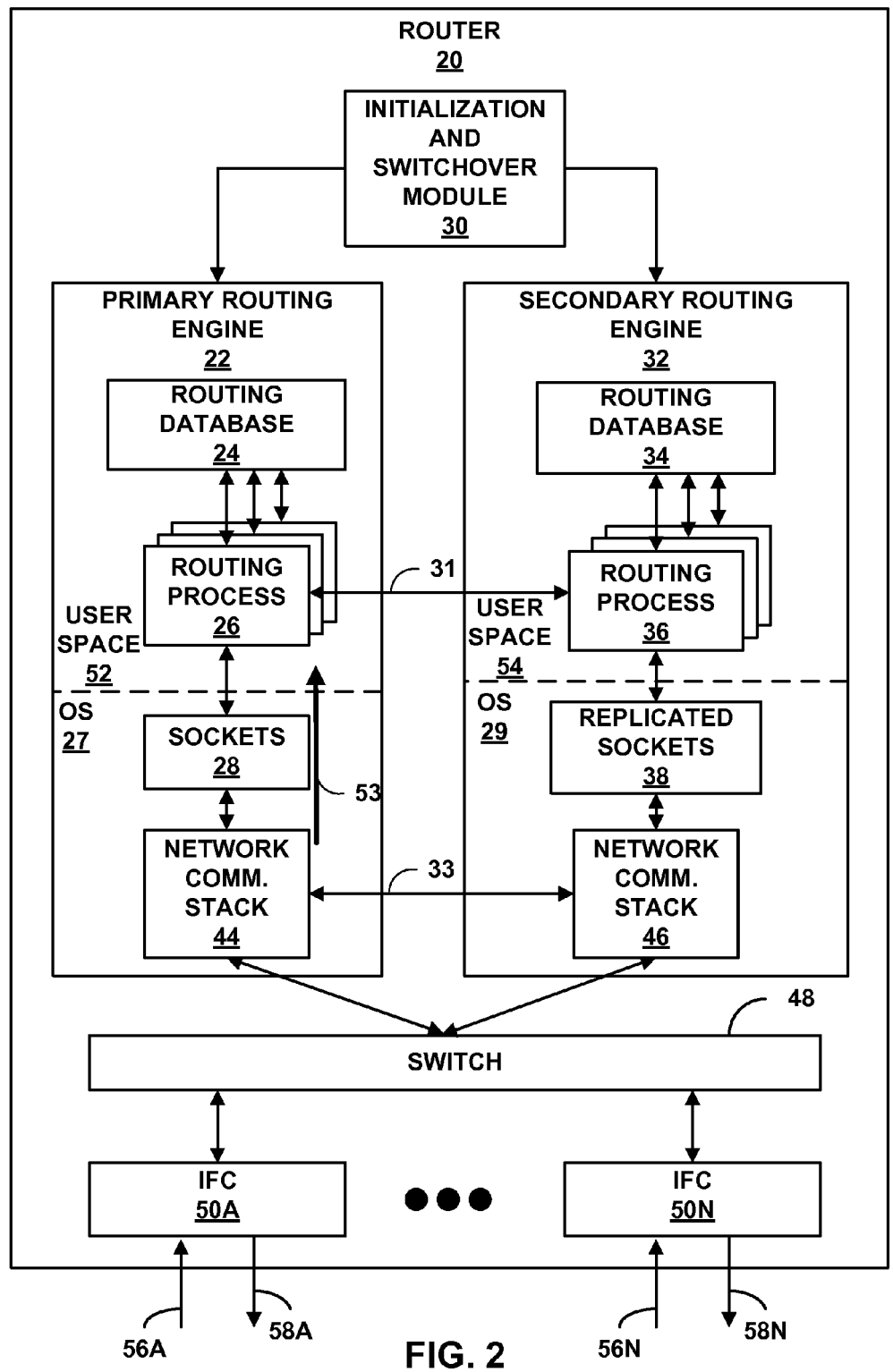
FIG. 2 is a block diagram illustrating an example router capable of performing a switchover from a primary routing engine to a secondary routing engine.

FIG. 2 is a block diagram illustrating an example router 20 capable of performing a graceful switchover from primary routing engine 22 to a secondary routing engine 32 using the techniques described herein. Router 20 may, for example, correspond to router 6A of FIG. 1.

In the example embodiment of FIG. 2, router 20 includes primary routing engine 22 and secondary routing engine 32. In this manner, router 20 may be viewed as having a primary control unit and a backup control unit. Primary routing engine 22 is responsible for maintaining routing database 24 to reflect the current topology of a network and other network entities to which router 20 is connected. That is, primary routing engine 22 includes user space 52 that provides an operating environment for execution of an application-layer routing process (daemon) 26 that implements one or more routing protocols to communicate with peer routers and periodically update routing database 24 to accurately reflect the topology of the network and the other network entities. Routing process 26 implements a routing protocol, e.g., BGP. User space 52 may include several other routing processes, each corresponding to a different routing protocol, such as BGP, Multi-Protocol BGP (MP-BGP), Intermediate System-to-Intermediate System (IS-IS), Open Shortest Path First (OSPF), Routing Information Protocol (RIP), Resource Reservation Protocol with Traffic-Engineering extensions (RSVP-TE) and Label Distribution Protocol (LDP). In a similar fashion, secondary routing engine 32 provides an operating environment for maintaining routing database 34 in accordance with data received from primary routing engine 22.

In a typical architecture, router 20 includes interface cards (IFCs) 50A-50N ("IFCs 50") that receive packets on inbound links 56A-56N ("inbound links 56") and sends packets on outbound links 58A-58N ("outbound links 58"). IFCs 50 are coupled to primary routing engine 22 and secondary routing engine 32 by high-speed switch 48. In another embodiment, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. U.S. Pat. No. 8,050,559, entitled MULTI-CHASSIS ROUTER WITH MULTIPLEXED OPTICAL INTERCONNECTS, issued on Nov. 1, 2011, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

Router 20 also includes initialization and switchover module (ISM) 30, which may also be referred to herein as simply a "switchover module." ISM 30 initializes router 20 to perform packet and data replication between primary routing engine 22 and secondary routing engine 32. ISM 30 may, for example, call procedures of network communication stack 44 of primary routing engine 22 and/or network communication stack 46 of secondary routing engine 32 in order to initialize router 20 for data replication. ISM 30 may also instruct secondary routing engine 32 to take control of routing procedures in case of a switchover or failover. ISM 30 may be implemented as a component separate from primary routing engine 22 and/or secondary routing engine 32 (e.g., by way of a separate controller), or may be implemented as software or other logic within the routing engines.

One or more routing protocols implemented by routing process 26 may establish peer routing sessions with other routers and, by way of these network communication sessions, exchange routing messages. As such, an operating system ("OS") 27 executing within primary routing engine 22 implements kernel-level processes for handling data at various layers of the open systems interconnection (OSI) networking model (shown as network communication stack 44). OS 27 provides an application programming interface (API) by which routing process 26 creates sockets 28 and establishes, for example, TCP/IP-based communication sessions for sending and receiving routing messages for each socket. Sockets 28 are logical constructs having data structures and state data maintained by OS 27 of primary routing engine 22 and may be viewed as acting as interfaces between routing process 26 and network communication stack 44 ("network comm. stack 44"). An example of network communication stack 44 is discussed with respect to FIG. 3.

Secondary routing engine 32 includes user space 54 that provides an operating environment for execution of routing process 36. Like routing process 26, routing process 36 and other routing processes on secondary routing engine 32 implement one or more routing protocols and periodically update routing database 34 to accurately reflect the topology of the network and the other network entities. That is, like routing process 26, routing process 36 is capable to send and receive routing messages through replicated sockets 38, where each of the replicated sockets corresponds to one of sockets 28 currently in use for routing communications. Routing process 36 receives replicated routing messages from primary routing engine 22, "snoops" on the routing messages received from primary routing engine 22 updates routing database 34 and builds output queue state based on the snooped messages. Replicated sockets 38 of secondary routing engine 32 are logical constructs having data structures and state data maintained by OS 29 and act as an interface between routing process 36 and network communication stack 46, also of secondary routing engine 32. An example of network communication stack 46 is also discussed with respect to FIG. 3.

The two instances of the routing process 26, 36 interact with each other using an out-of-band communication mechanism 31, such as a dedicated socket for exchanging data and control messages. This mechanism 31 is generally used for initial sync-up of network state and for exchanging replication socket handles allocated by the underlying operating systems.

For example, upon opening a new routing session, routing process 26 interacts with operating system 27 to allocate a new socket and tags the socket (referred to as the "original socket") for replication by an API call to operating system 27. The call causes operating system 27 to asynchronously set up the replication communications between protocol stacks 44, 46 as described below. Further, in some examples, operating system 27 may throttle all writes on the socket until the write succeeds, and all inbound application-layer data is buffered but not exposed to the application until replication is acknowledged, as discussed below. A socket handle returned by the operating system 27 is passed by the routing process 26 to routing process 36 via the out of band communication channel 31. Routing process 26 uses this handle to invoke a socket split procedure by OS 29 to obtain a socket descriptor pair (referred to as "Replicated Socket Pair"). In the replicated socket pair, one descriptor identifies a first replicated socket ("replicated rcv socket") that is used by OS 29 to mimic the original socket's receive buffer and the other descriptor corresponds to a second replicated socket ("replicated snd socket") used to mimic the original socket's send buffer.

After the replication has been initiated by the primary routing process 26, on the receive side of the original socket buffer, any data that is currently unread and any data that is received henceforth is replicated to the replicated rcv socket of the secondary routing process 36. On the send side (i.e., outbound side), only data subsequently sent (i.e., written to the original socket) will be replicated to the replicated snd socket of the secondary routing process 36. More specifically, at the time replication is initiated, routing processes 26, 36 exchange control message to initiate replication for a particular socket handle, control message to exchange socket options and TCP state for the socket, message to replicate any data currently in the original socket's rcv socket buffer, and control message to replicate any unacknowledged data in the original socket's snd socket buffer. The messages may be exchanged in the form of a request followed by an acknowledgement.

In general, when router 20 receives inbound data destined for primary routing engine 22, e.g. a TCP/IP packet received from link 56A of IFC 50A that has a destination IP address matching that of the primary routing engine, the packet is transferred to primary routing engine 22 through switch 48. Network communication stack 44 provides a hierarchy of software layers that processes the packets. After processing the data at lower levels of the stack but before the data at the transport layer with respect the TCP elements of the packet, components within network communication stack 44 replicate the packet and send the replicated packet to network communication stack 46 of secondary routing engine 32. In one embodiment, network communication stack 44 may send the replicated packet to network communication stack 46 in the form of an IP packet over a dedicated internal network interconnect. Network communication stack 44 may also wait for an acknowledgement from network communication stack 46 of reception of the replicated packet, before processing the TCP portion of the packet and advancing the packet up the software stack.

Upon receipt of the packet, network communication stack 46 of secondary routing engine 32 sends an acknowledgement of reception to network communication stack 44, at which point network communication stack 44 continues to process the packet through the upper portions of the protocol stack including the transport layer and above. Network communication stack 46 may then send the replicated packet to routing process 36 via replicated sockets 38. In one embodiment, for each peer communication session, replicated sockets 38 may include a send socket and a receive socket (as shown in, e.g., FIG. 3). Network communication stack 46 may push data that has been received from one of IFCs 50 to the receive socket of replicated sockets 38.

As network communication stack 44 completes processing the inbound packet, operating system 27 associates the packet with an appropriate one of sockets 28, typically raising an event or flag to indicate to routing process 26 that inbound data has been received on the socket and is ready to be de-queued for processing. In one embodiment, this may occur concurrently with network communication stack 46 associating the replicated packet with a corresponding one of replicated sockets 38 for communication to routing process 36. Upon de-queuing application-layer data from the inbound socket, routing process 26 processes the communication in accordance with the corresponding routing protocol and updates routing database 24. Routing process 36 similarly de-queues application-layer data from the corresponding inbound socket of replicated sockets 38, processes the application-layer data in accordance with the appropriate routing protocol and updates routing database 34.

Network communication stack 44 also includes components that monitor socket 28 for outbound data received from routing process 26. When routing process 26 pushes application-layer data for a routing protocol to socket 28, network communication stack 44 may retrieve the data from socket 28. Before processing and partitioning the application-layer routing data into one or more TCP packets, upper-level components within network communication stack 44 (i.e., components above the transport level) intercept the application-layer data, replicate the data and send the replicated data to upper-level components within network communication stack 46 of secondary routing engine 32. Network communication stack 44 may wait for an acknowledgement of reception of this replicated data before forming one or more TCP packets from the data.

In normal operation, when network communication stack 46 receives data sent by routing process 26 of primary routing engine 22, network communication stack 46 replicates the outbound data and pushes the data to a corresponding send socket of replicated sockets 38. In response, network communication stack 46 processes the application-layer data to update various TCP-related state data of network communication stack 46 as if the data were sent out the corresponding replicated send socket. Network communication stack 46 then acknowledges receipt of the data to network communication stack 44 of primary routing engine 22. Upon receiving the acknowledgement from network communication stack 46, network communication stack 44 delivers the outbound data to the transport layer of the stack, which partitions the application-layer routing data to form one or more TCP/IP packet from the data, updates TCP-related state data and outputs the packet(s) to one of IFCs 50 for transmission to the routing peer.

In the case of outbound data being sent to a routing communication session peer from routing process 26 on primary routing engine 22, the process for TCP socket replication is more involved than in the case of inbound data received from a routing communication session peer. Routing process 36 on secondary routing engine 32 must parse the outbound updates and infer the necessary route advertisement state. This can create an asymmetric workload between primary routing engine 22 and secondary routing engine 32, because primary routing engine 22 need only create an update, possibly taking advantage of an update group to quickly replicate that update to many peers. The workload scales (very approximately) as the number of distinct outbound policies. Secondary routing engine 32 must then consume each of the replicated routing updates, parsing each replicated routing update and inferring the state. The workload scales (again approximately) as the number of routing communication session peers. The number of routing communication session peers will always be greater or equal to the number of policies, often much greater. This imbalance may favor primary routing engine 22, allowing primary routing engine 22 to generate data faster than secondary routing engine 32 can consume the data. Whether for the reasons discussed above or for other reasons, situations can arise where routing process 36 on secondary routing engine 32 is CPU-bound and fails to drain the TCP socket fast enough. In this case the TCP "snoop" socket buffer on secondary routing engine 32 can fill, and secondary routing engine 32 will not be able to timely send the acknowledgement to primary routing engine 22. If secondary routing engine 32 does not timely acknowledge to primary routing engine 22 receipt of a routing update segment, primary routing engine 22 will be unable to send the routing update segment to the external peer.

Even though routing process 26 on primary routing engine 22 generates messages in a timely fashion, and even though the external peer has not flow-blocked the routing communication session, and even though the (external) network is uncongested, resource exhaustion in secondary routing engine 32 can prevent router 20 from sending messages to its routing communication session peer, and the routing communication session can fail because the peer has not received any messages within a configured interval.

The goal of the overall system is to maintain the routing communication sessions, and state synchronization between primary routing engine 22 and secondary routing engine 32 is merely a means to that end. If a choice must be made between state synchronization between primary routing engine 22 and secondary routing engine 32 and sending sufficient messages (including keepalive messages, for example) to maintain the routing communication session, then the correct choice is to abandon state synchronization (and try to get it back later) rather than abandoning the routing communication session. In the case under consideration, the resource that becomes exhausted, preventing TCP mirroring from continuing, is socket buffer space on secondary routing engine 32, albeit this exhaustion may in turn be caused by routing process 36 being CPU-bound.

In accordance with the techniques of this disclosure, in some examples secondary routing engine 32 is configured to determine whether the socket buffer of the secondary routing engine 32 has reached a predefined high occupancy threshold, and in response outputs a notification to primary routing engine 22 indicating that the socket buffer of the backup routing engine 32 has reached the predefined high occupancy threshold. Primary routing engine 22, in response to receiving the notification, is configured to inform application-layer routing process 26. For example, network communication stack 46 can send the notification to network communication stack 44, which in turn may signal the application-layer routing process 26 to notify the application-layer routing process 26 that the socket buffer of the secondary routing engine 32 has reached the predefined high occupancy threshold, such as by sending a signal 53 up to application-layer routing process 26. In some examples, network communication stack 44 may set a flag within memory space readable by routing process 26, to indicate that the predefined high occupancy threshold ("high water mark") has been reached. In response, routing protocol 26 may stop sending at least some routing updates to the routing peer network device associated with a routing communication session and only send to the routing peer network device keepalive messages for the routing communication session. Keepalive messages are smaller and thus occupy less buffer space than routing update messages. By reducing the amount of data emitted by primary routing engine 22 when secondary routing engine 32 becomes critically congested, the risk of a buffer overrun can be mitigated and the socket mirroring maintained. This is referred to herein as putting the routing communication session that is carried over the affected socket into "life-support mode."

Although described for purposes of example as using a high water mark threshold, in other examples secondary routing engine 32 may use a main socket buffer and an additional "emergency space" buffer, and network communication stack 46 emits the notification in response to detecting that the main socket buffer has filled and subsequent traffic is going into the "emergency" buffer. In this example, detecting that traffic is going into the emergency buffer is equivalent to detecting that a buffer of the secondary routing engine for buffering the replicated data has reached a predefined high occupancy threshold.

Primary routing engine 22 will typically not remain in life-support mode indefinitely, since while on life-support, routing updates are not being conveyed to the external routing communication session peer, and thus the network is adversely impacted. This is addressed by pushing primary routing engine 22 from life-support mode to full desynchronization of the socket if primary routing engine 22 does not receive another notification from secondary routing engine 32 within a predefined time period, where the notification indicates that the socket buffer of secondary routing engine 32 has decreased to a predefined low occupancy threshold. When the socket is desynchronized, primary routing engine 22 is not replicating state for that socket. Secondary routing engine 32 should be made aware of its replication state, so that if a failover occurs while a socket is not fully replicated, routing process 36 will reset the routing communication session rather than trying to continue it.

Figure 3:
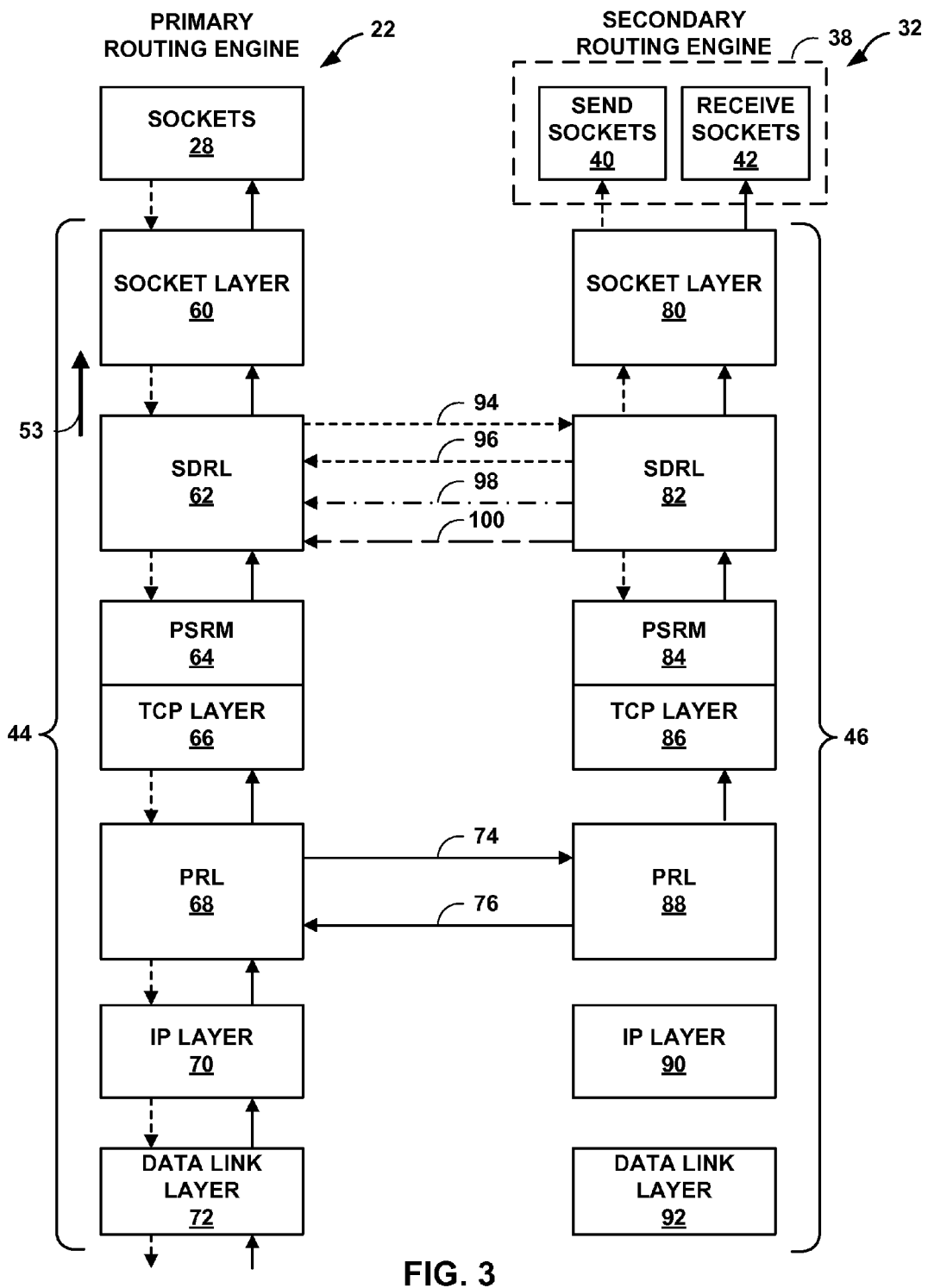
FIG. 3 is a block diagram illustrating an example of a protocol stack of a primary routing engine and a protocol stack of a secondary routing engine.

FIG. 3 is a block diagram illustrating an example of network communication stack 44 of primary routing engine 22 and network communication stack 46 of secondary routing engine 32. Each of network communication stack 44 and network communication stack 46 hierarchically implement various network protocols, such as TCP and IP, at various levels as shown in FIG. 3. FIG. 3 also depicts communication paths of packets received and data sent when primary routing engine 22 is operational. The path of received packets is illustrated by a solid arrow, while the path of sent data is depicted by a dashed arrow.

Although described for purpose of example primarily with respect to TCP, the techniques described herein may be applied to any protocol in which session state replication from a primary routing engine to a secondary routing engine is useful. Likewise, the techniques described herein may be applied to various Internet layer protocols, such as IPv4 or IPv6. Moreover, although described with respect to network communication stack 44 and network communication stack 46 of router 20 of FIG. 2, it should be understood that, in one embodiment, network communication stack 44 may be on a first router and network communication stack 46 may be on a second router; the first router and the second router may then send communications in accordance with the described techniques using, for example, TCP/IP over a network. In this manner, the primary routing engine and the secondary routing engine need not be present on the same network device.

Further, although described for purpose of example primarily with respect to a routing protocol such as BGP, the techniques described herein may be applied to any control-plane routing protocol, such as MP-BGP, IS-IS, OSPF, RIP, RSVP-TE, and LDP, for example, and may be particularly applicable to control-plane protocols that can run over a transport protocol such as TCP.

As shown in FIGS. 2 and 3, secondary routing engine includes replicated sockets 38, which for each TCP connection includes one of send sockets 40 and one of receive sockets 42. In general, each of send sockets 40 provides an input for receiving outbound application-layer data (i.e., routing messages) that have been sent by primary routing engine 22 and replicated to secondary routing engine 38 for processing. Each of receive sockets 42 provides an input to buffer application-layer data that has been sent to primary routing engine 22 by a peer router and replicated to secondary routing engine by way of packet replication layers (PRLs) 68, 88. For each routing session maintained by routing process 26 of primary routing engine 22, the corresponding pair of replicated sockets 38 (i.e., one of send sockets 40 and one of receive sockets 42) are read-only to routing process 36 of secondary routing engine 32 and are used by routing process 36 to snoop on the data sent and received by routing process 26 on the original socket, which represent a bi-directional communication session. Routing process 36 of the secondary routing engine 32 reads from these two sockets and keeps its state updated based on the observed routing message exchange between the primary routing engine and the peer router anchoring the other end of the routing communication session.

In general, various layers of network communication stack 44 and network communication stack 46 are implemented similarly to each other and, and some of the layers perform comparable tasks in accordance with the OSI model. For example, data link layer 72 and data link layer 92 each receive and send packets from switch 48 at the data link layer. Data link layer 72 is active when primary routing engine 22 is active, whereas data link layer 92 sends and receives data when secondary routing engine 32 is active, i.e., in the event of a switchover such as a failover when primary routing engine 22 is active. Data link layer 72 sends incoming packets to and receives outgoing packets from IP layer 70. Similarly, data link layer 92 sends incoming packets to and receives outgoing packets from IP layer 90 when secondary routing engine 32 is active.

IP layer 70 is responsible for receiving incoming data from data link layer 72, processing the data, and sending the processed data to packet replication layer (PRL) 68. IP layer 70 receives outgoing data from TCP layer 66, which bypasses PRL 68, processes the data, and passes the data to data link layer 72. When secondary routing engine 32 is active, IP layer 90 receives incoming data from data link layer 92, processes the data, and sends the data to PRL 88, and IP layer 90 receives outgoing data from TCP layer 86, processes the data, and sends the data to data link layer 92.

To provide socket replication from the viewpoint of the routing process and ensure predictable data state on the secondary routing engine in the event of a failover, protocol stacks 44, 46 may include synchronization points for both data as well as transport state. Moreover, the synchronization points may be structured such that: (i) there is minimal disruption to normal TCP operation from the perspective of both routing processes 26, 36 as well as peer routers, and (ii) the state of both data and transport can be predicted and verified to as large an extent as possible.

As shown in FIG. 3, protocol stacks 44, 46 each include additional layers to the network stack: a socket data replication layer (SDRL) and a packet replication layer (PRL). For example, SDRLs 62, 82 are included below socket layers 60, 80 and above the transport layers, i.e., TCP layers 66, 86, and are responsible for synchronizing, on a per record basis, the outgoing application-layer data (i.e., routing messages including routing updates and routing protocol peering session keepalive messages) written by routing process 26 of primary routing engine 22 on an original socket for the routing session to the corresponding one of send sockets 40 of the secondary routing engine 32. In addition, PRL 68, 88 are included in protocol stacks 44, 46 below the transport layer and are primarily responsible for replicating incoming packets to the secondary routing engine. In the example of FIG. 3, PRL 68 and PRL 88 are situated between layers three and four of the OSI model. In addition, protocol state replication modules (PSRM) 64, 84 have been included above TCP layers 66, 86 and are responsible for setting up initial TCP state, maintaining the TCP state, and activating TCP communications on the secondary routing engine in the event of failover. PSRM 64 and PSRM 84 may be viewed as shim modules that are located just above layer four of the OSI model.

The operation and roles of SDRLs 62, 82, PRLs, 68, 88 and PSRMs 64 and 84 are described in further detail in the sections that follow. A routing engine, such as routing engine 22, may implement the functionality described with respect to, e.g., PRL 68 in the form of a module, such as an executable software, firmware, or hardware module. Similarly, a routing engine may implement the functionality described with respect to SDRL 62 and PSRM 64 in the form of one or more modules. A routing engine may also incorporate these functions into existing modules.

PSRM 64 may perform an initial setup of TCP layer 66 in response to a direct procedure call by ISM 30 of router 20. In addition, PSRM 64 initializes some TCP state from original socket that needs to be replicated to the secondary routing engine to set up the replicated socket pair on the secondary. For example, when replication is set up, ISM 50 may invoke PSRM 64 to establish initial TCP state for any socket to be replicated. PSRM 84 initializes TCP layer 86 of secondary routing engine 32 in a similar manner upon receiving a message from PSRM 64. In the event of a switchover, PSRM 84 may activate a TCPCB subcommand of TCP layer 86 on secondary routing engine 32 such that secondary routing engine 32 may resume routing duties that were performed by primary routing engine 22.

When routing process 26 creates a new socket for a routing session, socket layer 60 creates a corresponding socket structure. Once the TCP session is established with the peer, routing process may enable socket replication on this socket. This will initiate setting up of SDRL, PSRM and PRL layers for the socket. SDRL 62 acts as an interface to call the transport layer (e.g., PSRM 64 and TCP layer 66) and transparently invokes PSRM 64.

As discussed above, PRL 68, 88 are included within protocol stacks 44, 46 below the transport layer and operate in accordance with the techniques described herein to replicate incoming packets to the secondary routing engine. In this example, PRL 68 and PRL 88 are situated between layers three and four of the OSI model. In some examples, PRL 88 may be responsible for determining available buffer space in each of receive sockets 42.

PRL 68 replicates the incoming TCP packets and sends the replicated TCP packets 74 to PRL 88. PRL 88 may send acknowledgement message 76 to PRL 68 to acknowledge receipt of replicated TCP packets. After incoming TCP packets have been replicated and acknowledged, the TCP packets are pushed up network communication stack 44 and network communication stack 46 in parallel. That is, PRL 68 may receive acknowledgement 76 and then push the packet to TCP layer 66. PRL 88 may concurrently push replicated packet to TCP layer 86.

After PRL 68 and PRL 88 have replicated and acknowledged a received TCP packet, the received packet is passed up through each of network communication stack 44 and network communication stack 46 and is processed according to the required protocols. That is, each of the higher levels of each respective protocol stack may buffer and process the packet in accordance with implementations of the associated protocols at those levels. For example, TPC layer 66 may process received TCP packets so as to remove TCP headers and re-assemble higher-level data units, such as application-layer data. Primary routing engine 22 receives the assembled application-layer data through an interface associated within the particular one of sockets 28 with which the data is associated. Routing process 26 processes the application-layer data in accordance with the particular routing protocol. Routing process 36 executing on secondary routing engine 32 may similarly receive replicated application-layer data (e.g., routing messages) on the corresponding one of receive sockets 42 and process routing messages to update routing database 34. In other words, routing process 36 of secondary routing engine 32 processes the routing messages so as to keep track of the current state of the network with respect to routing topology. This allows secondary routing engine 32 to maintain current internal state so that it is able to resume routing operations quickly in response to a switchover event.

Socket data replication layers (SDRLs) 62, 82 are responsible for replicating outgoing application-layer data (i.e., routing messages) written by routing process 26 on an original socket to the corresponding one of send sockets 40 of the secondary routing engine 32. In one example, SDRL 62 and SDRL 82 are positioned between layers four and five of the OSI model.

When primary routing engine 22 is sending data, SDRL 62 receives application-layer data from one of sockets 28 and plays an active role in replication of data prior to the outbound data being processed by the transport layer of network communication stack 44. For example, SDRL 62 may replicate the outbound application-layer data (e.g., routing message) and send replicated data 94 to SDRL 82. Replicated data 94 may be sent as a data signal via an internal data path, e.g., as a message via a communication channel 33 (FIG. 2). In examples in which secondary routing engine 32 resides on a different router, replicated data 94 may be sent via an external signal.

The techniques of this disclosure make use of a predefined high buffer occupancy threshold ("high water mark") and a predefined low buffer occupancy threshold ("low water mark") to the send socket replication buffer (or "SDRL snoop buffer") on secondary routing engine 32. Secondary routing engine 32 will notify primary routing engine 22 when buffer occupancy exceeds the high water mark, such as by SDRL 82 outputting a high water mark notification 98, and secondary routing engine 32 will notify primary routing engine 22 again when buffer occupancy falls below the low water mark, such as by SDRL 82 outputting a low water mark notification 100. Notifications 98, 100 may be data signals communicated between SDRLS 82, 62 via a communication channel such as communication channel 33. The SDRL 62 of network communication stack 44 at the kernel on primary routing engine 22 will in turn pass those notifications to the application (routing process 26), such as by sending a signal 53, setting a flag within memory space readable by routing process 26, and the like. When routing process 26 receives a high water notification 98, routing process 26 places the session associated with the socket into "life-support" mode. In this mode, in some examples routing process 26 only sends keepalive messages for the session, and no other data. These are routing communication session keepalive messages, which means from the point of view of TCP all that has happened is the amount of data and the rate at which routing process 26 is sending data have decreased a great deal.

In some examples, routing process 26 may send some routing updates in addition to keepalive messages when in the life-support mode, e.g., based on prioritization of routing updates. For example, routing updates associated with critical events may be sent by the primary routing engine 22, while other non-critical routing updates may be held and not sent while in the life-support mode. For example, a critical event may be a change to a next hop of a downstream router. When in the life-support mode, routing process 26 can elect not to send any routing updates and only send keepalive messages. Primary routing engine 22 may hold routing updates that are not being sent during the life-support mode, and may later send the held routing updates when no longer operating in life-support mode. The decision on whether to send routing updates when in the life-support mode is made by the routing process 26 at the application layer, executing in user space 52 of primary routing engine 22.

Similarly, when routing process 26 receives a low water notification 100 (e.g., within a time period) passed up from SDRL 62 which receives it from SDRL 82, routing process 26 takes the session out of life-support mode, and passes all normal routing data over the session again, including routing updates that may have been held while in the life-support mode. The mechanisms involved in moving between the standard and life-support states, both in the transport (on primary routing engine 22 and secondary routing engine 32) and in routing process 26, may be low-cost, so even if there are many transitions between normal and life-support states, there will be minimal negative consequences. Also, they do not require state changes on secondary routing engine 32 so invariants guaranteed by the pre-existing NSR design are maintained such that NSR correctness is not compromised.

When routing process 26 places a session in life-support mode, routing process 26 begins running a timer to bound the length of time the session is allowed to remain in life-support mode. A reasonable value for this timer is the BGP hold time, since the expectation is that under normal circumstances, if the session were to be catatonic for longer than the hold time, the session would be torn down. However, if the timer expires before routing process has received a low water mark notification 100 from secondary routing engine 32, routing process 26 need not tear down the session to the external peer, since the external peer is not the source of the problem. Rather, routing process 26 "tears down" the session to the problem entity, secondary routing engine 32. To do this, routing process 26 "unreplicates" the socket. When the socket is unreplicated, routing process 26 no longer maintains synchronization between primary routing engine 22 and secondary routing engine 32. For example, routing process 26 may invoke an "unreplicate a socket" primitive by an API call to operating system 27 to unreplicate the socket. For example, a socket handle returned by the operating system 27 may be passed by the routing process 26 to routing process 36 via the out of band communication channel 31. In this manner, secondary routing engine 32 will be properly aware of its current unreplicated state, such that secondary routing engine 32 will restart the routing communication session if failover occurs while in the current state.

Routing process 26 may subsequently bring secondary routing engine 32 back into synchronization with primary routing engine 22, e.g., by again tagging the original socket for replication by an API call to operating system 27, and restore full NSR functionality. Since the process of bringing secondary routing engine 32 back into synchronization is resource-intensive, routing process 26 may incorporate a backoff mechanism to avoid repeated rapid restarts.

In this manner, router 20 can use the techniques of this disclosure to maintain internal NSR state synchronization for some bounded "life-support" period by reducing the rate at which primary routing engine 22 transmits data to its routing peer, allowing secondary routing engine 32 to catch up on processing data in socket buffers of send sockets 40 and thereby improve scale of an NSR-enabled system while simultaneously improving its stability.

In the event of a switchover from primary routing engine 22 to secondary routing engine 32, network communication stack 46 becomes fully active and assumes full routing responsibilities. To achieve a switchover, in one embodiment, switchover module 30 may activate a TCP control block (TCPCB) of PSRM 84. For example, switchover module 30 may initialize the TCPCB with timers or other control features for TCP and direct PSRM 84 to become active. Switchover module 30 may perform a switchover from primary routing engine 22 to secondary routing engine 32 when, for example, primary routing engine 22 fails or when primary routing engine 22 must be brought down in order to install a software update for primary routing engine 22.

In general, in the event of a switchover, PRL 88 and SDRL 82 may become passive, in one embodiment, so as to pass through calls and data without modification or interference. That is, PRL 88 and SDRL 82 may stop receiving replicated data and merely pass data between the other layers of network communication stack 46, as described herein. In one embodiment, a router may further include a tertiary or even greater number of back-up routing engines (not shown), in which case, in the event of a switchover, PRL 88 and SDRL 82 switch from receiving replicated data to replicating data for the other back-up routing engines. Further, upon restart of primary routing engine 22, the primary routing engine 22 may assume a backup role and PRL 88 and SDRL 82 may replicate outbound routing messages and inbound packets to network communication stack 44.

After a switchover, the other layers of network communication stack 46 operate in a conventional manner. For example, data link layer 92 sends and receives data to and from switch 48. Data link layer 92 may process incoming data from switch 48 to obtain data units and pass the data units to IP layer 90 for formulation of IP packets. Likewise, when data link layer 92 receives an outbound IP packet from IP layer 90, data link layer 92 may process the packet for transmission through switch 48 as one or more data units. IP layer 90 passes inbound IP packets through PRL 88 to TCP layer 86 and receives outgoing packets from TCP layer 86 through PRL 88. TCP layer 86 receives inbound IP packets from IP layer 90 through PRL 88 and processes the incoming packets to assemble application-layer data for communication to socket layer 80 through SDRL 82. TCP layer 86 may also receive outgoing application-layer data from socket layer 80 through SDRL 82 for partitioning into TCP packet(s) and delivery to IP layer 90.

Figure 4A:
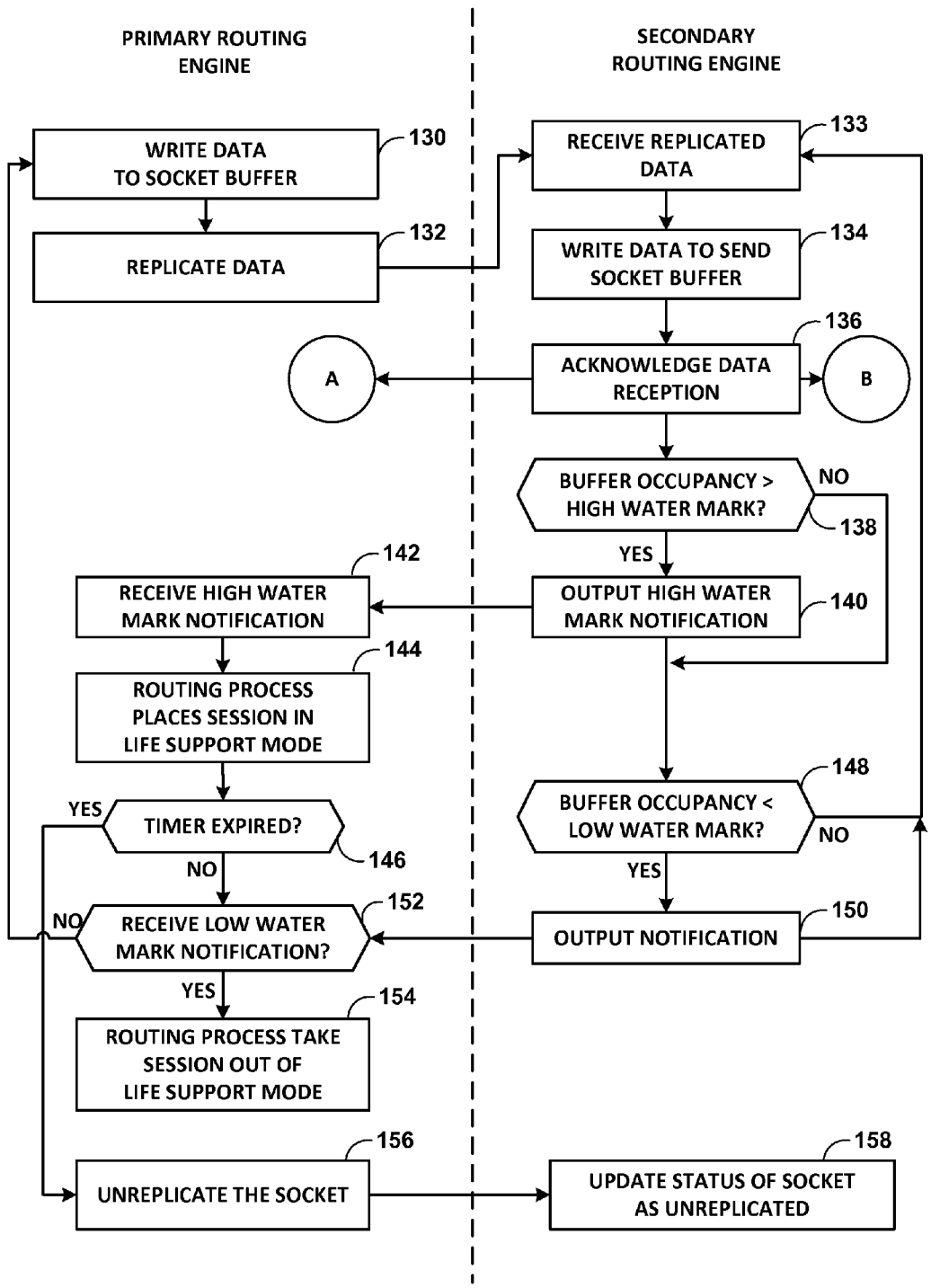
FIGS. 4A-4B are flowcharts illustrating example operation of one or more network devices in a network using the techniques described herein.
Figure 4B:
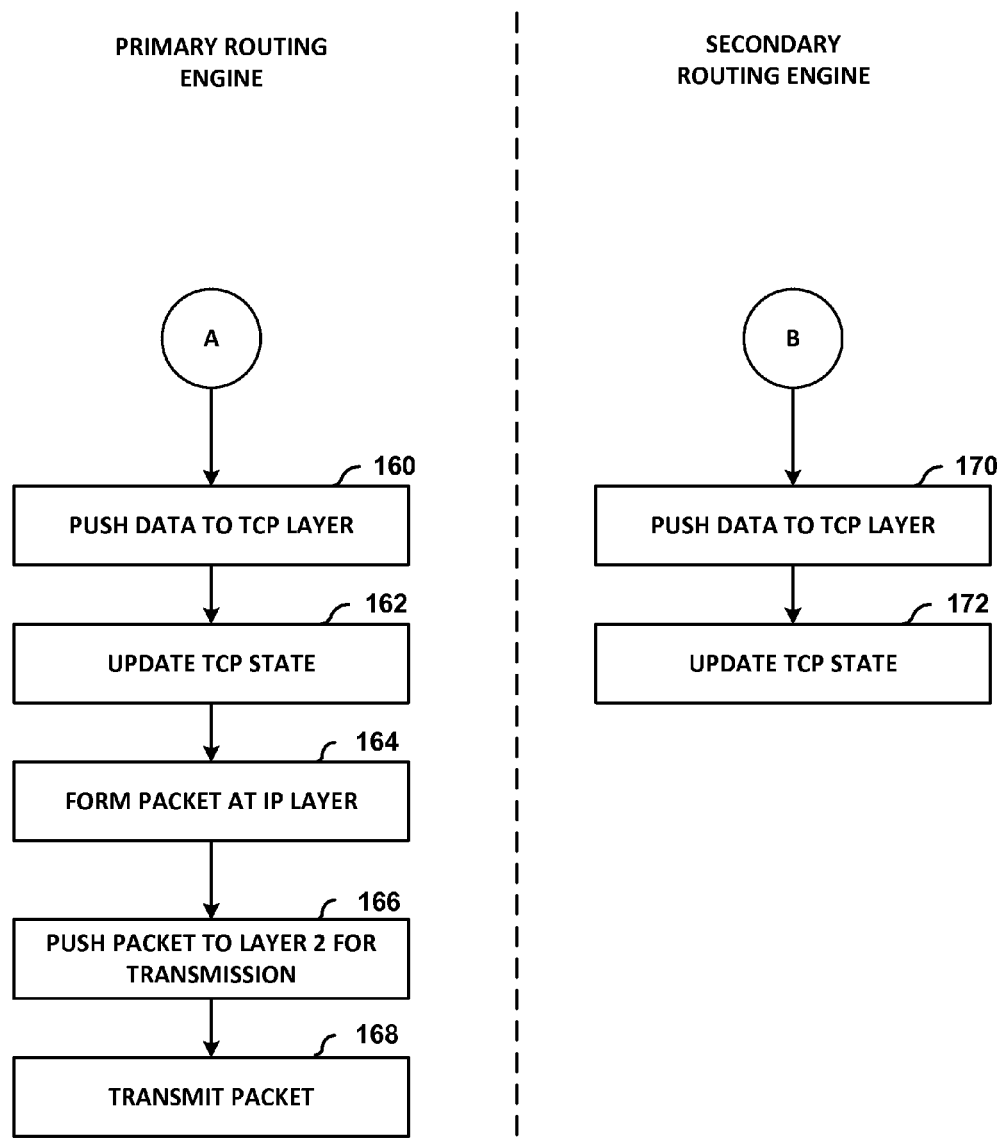

FIGS. 4A-4B are flowcharts illustrating example operation of one or more network devices in a network in using the techniques described herein. FIGS. 4A-4B will be described for purposes of example with respect to FIGS. 2 and 3. Initially, routing process 26 on primary routing engine 22 writes a routing protocol message (e.g., a BGP update message) in the form of application-layer data to one of sockets 28 of primary routing engine 22, i.e., the socket corresponding the particular routing session for which the routing message is being output (130). When the socket has data available for sending, socket layer 60 retrieves the application-layer data from socket 28 and processes the application-layer data by passing the data to SDRL 62. SDRL 62, in turn, replicates the application-layer data and sends a copy of the routing message as replicated data 94 to SDRL 82 of secondary routing engine 32 (132).

SDRL 82 of secondary routing engine 32 receives the replicated application-layer data (133), SDRL 82 sends the replicated data up to socket layer 80 of secondary routing engine 32, which associates the replicated data with a corresponding one of send sockets 40 and writes the application-layer data to the send socket buffer so as to make the outbound routing message available to routing process 36 of secondary routing engine 32 (FIG. 2) (134). SDRL 82 may also send the replicated data, or portions thereof, down to PSRM 84 so that PSRM 84 may maintain state information for TCP layer 86, e.g., updating the snd_nxt and snd_up values within the corresponding TCPCB. SDRL 82 may also acknowledge receipt of replicated data 94 by sending acknowledgement 96 to SDRL 62 (136).

SDRL 82 on secondary routing engine 32 monitors buffer occupancy of send sockets 40. SDRL 82 is configured with one or more buffer occupancy thresholds, such as a high water mark threshold indicating that buffer occupancy is nearing capacity and a low water mark threshold indicating that buffer occupancy is low. If SDRL 82 detects that the buffer occupancy has exceeded the high water mark threshold (YES branch of 138), SDRL 82 outputs a high water mark notification message 98 for the socket buffer to SDRL 62 of primary routing engine 22 (140).

When SDRL 62 receives the high water mark notification message from SDRL 82 (142), SDRL 62 passes the message up to the appropriate routing process 26, such as by signal 53, and routing process 26 in turn determines that the corresponding routing communication session should be placed into a "life support mode." A described above, when routing process 26 is operating in the life support mode for a given session, routing process 26 will send only a subset of routing communications to the routing peer on the routing communication session, and will hold some of the routing communications without transmitting them. In some examples, routing process 26 may be configured to send only keepalive messages on the session when in the life support mode. In some examples, routing process 26 may send keepalive messages and only a subset of routing updates based on a priority level associated with the routing updates (e.g., sending only those routing updates having a critical priority level). For example, routing process 26 may use a priority scheme that categorizes routing communications into two or more priority levels.

When routing process 26 operates in the life support mode, routing process 26 is sending fewer routing communications on the routing communication session and, as a result, sends less replicated data to secondary routing engine 32. This allows secondary routing engine 32 to get caught up on processing the replicated data already stored in send sockets 40. SDRL 82 continues to monitor buffer occupancy of send sockets 40. When SDRL 82 detects that buffer occupancy is below the water mark threshold (YES branch of 148), SDRL 82 outputs a low water mark notification message for the socket buffer to SDRL 62 of primary routing engine 22 (150).

In some examples, routing process 26 is configured not to allow the session to remain in life support mode indefinitely, but will set a timer for the session such that when the timer expires (YES branch of 146) routing process 26 will unreplicate the socket 156. When the socket is unreplicated, routing process 26 no longer maintains synchronization between primary routing engine 22 and secondary routing engine 32. For example, routing process 26 may invoke an "unreplicate a socket" primitive by an API call to operating system 27 to unreplicate the socket. For example, a socket handle returned by the operating system 27 may be passed by the routing process 26 to routing process 36 via the out of band communication channel 31. In this manner, secondary routing engine 32 can keep track of which sessions are unreplicated so it can operate appropriately if a switchover occurs. For example, the life-support timer value may correspond to the hold time, i.e., the interval after which the routing peer will drop the session if it has not received certain routing communications. For example, the timer may be set between 3-180 seconds.

In some examples, routing process 26 will stay in the life support mode until either the timer has expired (YES branch of 146) or, if the timer has not yet expired, until routing process 26 receives an indication from SDRL 62 that SDRL 62 has received a low water mark notification 100 from SDRL 82 (YES branch of 152). After the low later mark notification 100 is received, routing process 26 takes the session out of the life support mode (154) and reverts to the normal operation in which all routing updates and keepalive messages are sent on the routing communication session. After taking the session out of life support mode, routing process 26 may also send all of the routing updates that were held when routing process 26 was operating in the life support mode.

FIG. 4B is a flowchart illustrating example operation of one or more network devices in a network in using the techniques described herein. After sending the acknowledgement 96 to SDRL 62 on primary routing engine 22, SDRL 82 pushes the application-layer data down to TCP layer 86 on secondary routing engine 32 to be processed by the lower-layers of the protocol stack in accordance with their normal operation (170). PSRM 84 updates TCP state information within the sockets TCPCB on the secondary routing engine 32 based on information received from SDRL 82 (172). In this manner, TCP state is updated the same on the secondary routing engine 32 as on the primary routing engine 22, to provide non-stop routing in the event it is necessary to failover to the secondary routing engine. Additionally, upon receiving acknowledgement 96 from SDRL 82, SDRL 62 of primary routing engine 22 similarly pushes the application-layer data down to TCP layer 66 to be processed by the lower-layers of the protocol stack in accordance with their normal operation (160). PSRM 64 updates TCP state information within the sockets TCPCB on the primary routing engine based on information received from SDRL 62 (162). TCP layer 66 receives the outbound application-layer data, in light of the updated state information, to form one or more TCP packets. TCP layer 66 passes the TCP packet(s) to IP layer 70 (transparently through PRL 68) to be formed as IP packets for output (164). IP layer 70 passes the IP packets to layer two (data link layer 72) for transmission (166), which in turn may output the packet to switch 48 to transmit the packet to a routing peer via one of IFCs 50 (168).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
by a primary routing engine of a network device, replicating data output by an application-layer routing process of the primary routing engine for transmission to a routing peer network device via a routing communication session between the network device and the routing peer network device;
sending the replicated data to a secondary routing engine of the network device;
by the secondary routing engine, in response to detecting that a socket buffer of the secondary routing engine for buffering the replicated data has reached a predefined high occupancy threshold, outputting a notification to the primary routing engine indicating that the socket buffer has reached the predefined high occupancy threshold;
by the primary routing engine and in response to receiving the notification, signaling the application-layer routing process to notify the application-layer routing process that the socket buffer of the secondary routing engine has reached the predefined high occupancy threshold; and
by the application-layer routing process of the primary routing engine and in response to receiving the signal, entering a life-support mode in which the application-layer routing process refrains from sending at least some of a plurality of routing updates to the routing peer network device via the routing communication session, and continues to send keepalive messages for the routing communication session to the routing peer network device.

2. The method of claim 1, wherein each of the plurality of routing updates has an associated priority level, further comprising:
by the application-layer routing process, sending high priority routing updates to the routing peer network device while in the life-support mode; and
by the application-layer routing process, holding low priority routing updates without sending the low priority routing updates to the routing peer network device while in the life-support mode.

3. The method of claim 1, wherein refraining from sending at least some of a plurality of routing updates to the routing peer network device via the routing communication session comprises holding all of the plurality of routing updates without sending the routing updates to the routing peer network device while in the life-support mode.

4. The method of claim 1, further comprising:
receiving an acknowledgement from the secondary routing engine at the primary routing engine indicating reception of the data;
in response to receiving the acknowledgement, processing the data at the transport layer of the primary routing engine to create a packet; and
transmitting the created packet with the primary routing engine to the routing peer network device.

5. The method of claim 1, further comprising:
receiving the notification at a socket data replication layer of the primary routing engine, wherein the socket data replication layer is positioned below a socket layer of the primary routing engine and above a transport layer of the primary routing engine; and
by the socket data replication layer of the primary routing engine, signaling the application-layer routing process to notify the application-layer routing process that the socket buffer of the secondary routing engine has reached the predefined high occupancy threshold.

6. The method of claim 1, further comprising:
upon entering the life-support mode, starting, by the primary routing engine, a timer associated with the routing communication session;
in response to determining that the timer has reached a threshold time period and the application-layer routing process is still in the life-support mode for the routing communication session, causing the primary routing engine to unreplicate a socket of the primary routing engine associated with the routing communication session.

7. The method of claim 6, wherein the threshold time period is set to a hold time period associated with the routing communication session.

8. The method of claim 1, further comprising:
by the secondary routing engine, outputting a notification to the primary routing engine indicating that the socket buffer of the secondary routing engine has reached a predefined low occupancy threshold;
by the primary routing engine, signaling the application-layer routing process to notify the application-layer routing process that the socket buffer of the secondary routing engine has reached the predefined low occupancy threshold; and
by the application-layer routing process and in response to the receiving the signal, taking the session out of the life-support mode and transmitting all routing communications to the routing peer network device via the routing communication session.

9. The method of claim 8, further comprising:
after taking the session out of the life-support mode, transmitting any routing updates held while in the life-support mode.

10. The method of claim 1,
wherein replicating the data before processing the data at the transport layer comprises replicating the data before processing the data at a transmission control protocol (TCP) layer of the primary routing engine.

11. The method of claim 1, further comprising storing, by the secondary routing engine, the replicated data in the socket buffer, wherein the socket buffer is associated with a replicated socket pair.

12. The method of claim 1, wherein the application-layer routing process operates in accordance with Border Gateway Protocol (BGP).

13. The method of claim 1, further comprising switching over from the primary routing engine to the secondary routing engine as the active routing engine.

14. A network device comprising:
a plurality of interface cards to send and receive packets over a network;
a first routing engine; and
a second routing engine, wherein the first routing engine is configured as a primary routing engine and the second routing engine is configured as a secondary routing engine,
wherein the first routing engine comprises a plurality of sockets, wherein each of the plurality of sockets is associated with one of a plurality of routing communication sessions with peer routers,
wherein the primary routing engine is configured to replicate data output by an application-layer routing process of the primary routing engine for transmission to a routing peer network device via a routing communication session between the network device and the routing peer network device, and send the replicated data to the secondary routing engine, wherein the secondary routing engine is configured to, in response to detecting that a socket buffer of the secondary routing engine for buffering the replicated data has reached a predefined high occupancy threshold, output a notification to the primary routing engine indicating that the socket buffer has reached the predefined high occupancy threshold, wherein the primary routing engine is configured to signal the application-layer routing process to notify the application-layer routing process that the socket buffer of the secondary routing engine has reached the predefined high occupancy threshold, and wherein the application-layer routing process of the primary routing engine is configured to, in response to receiving the signal, enter a life-support mode in which the application-layer routing process refrains from sending at least some of a plurality of routing updates to the routing peer network device via the routing communication session, and continue to send keepalive messages for the routing communication session to the routing peer network device.

15. The network device of claim 14, wherein each of the plurality of routing updates has an associated priority level, and wherein the application-layer routing process is configured to send high priority routing updates to the routing peer network device while in the life-support mode, and hold low priority routing updates without sending the low priority routing updates to the routing peer network device while in the life-support mode.

16. The network device of claim 14, wherein the application-layer process is configured to refrain from sending at least some of a plurality of routing updates to the routing peer network device via the routing communication session and hold all of the plurality of routing updates without sending the routing updates to the routing peer network device while in the life-support mode.

17. The network device of claim 14, wherein upon entering the life-support mode, the primary routing engine starts a timer associated with the routing communication session, and wherein in response to determining that the timer has reached a threshold time period and the application-layer routing process is still in the life-support mode for the routing communication session, the primary routing engine unreplicates a socket of the primary routing engine associated with the routing communication session so that routing communications are not being replicated to the secondary routing engine for the routing communication session.

18. The network device of claim 14, wherein the secondary routing engine outputs a notification to the primary routing engine indicating that the socket buffer of the secondary routing engine has reached a predefined low occupancy threshold;

wherein in response the primary routing engine signals the application-layer routing process to notify the application-layer routing process that the socket buffer of the secondary routing engine has reached the predefined low occupancy threshold; and wherein the application-layer routing process, in response to the receiving the signal, takes the session out of the life-support mode and transmits all routing communications to the routing peer network device via the routing communication session.

19. The network device of claim 18, wherein the primary routing engine, after taking the session out of the life-support mode, transmits any routing updates held while in the life-support mode.

20. A non-transitory computer-readable storage medium comprising instructions for causing at least one programmable processor to:

by a primary routing engine of a network device, data output by an application-layer routing process of the primary routing engine for transmission to a routing peer network device via a routing communication session between the network device and the routing peer network device;

send the replicated data to a secondary routing engine of the network device;

by the secondary routing engine of the network device, in response to detecting that a socket buffer of the secondary routing engine for buffering the replicated data has reached a predefined high occupancy threshold, output a notification to the primary routing engine indicating that the socket buffer has reached the predefined high occupancy threshold;

by the primary routing engine, signaling the application-layer routing process to notify the application-layer routing process that the socket buffer of the secondary routing engine has reached the predefined high occupancy threshold; and by the application-layer routing process of the primary routing engine and in response to receiving the signal, enter a life-support mode in which the application-layer routing process refrains from sending at least some of a plurality of routing updates to the routing peer network device associated with a routing communication session, and continues to send keep alive messages for the routing communication session to the routing peer network device.

* * * * *